United States Patent
Smith et al.

(10) Patent No.: US 11,899,116 B2
(45) Date of Patent: Feb. 13, 2024

(54) SINGLE BEAM DIGITALLY MODULATED LIDAR FOR AUTONOMOUS VEHICLE DISTANCE SENSING

(71) Applicant: Nuro, Inc., Mountain View, CA (US)

(72) Inventors: Russell Smith, Mountain View, CA (US); Hao Li, San Jose, CA (US)

(73) Assignee: NURO, INC., Mountain View, CA (US)

( * ) Notice: Subject to any disclaimer, the term of this patent is extended or adjusted under 35 U.S.C. 154(b) by 703 days.

(21) Appl. No.: 16/998,294

(22) Filed: Aug. 20, 2020

(65) Prior Publication Data

US 2021/0124055 A1    Apr. 29, 2021

Related U.S. Application Data

(60) Provisional application No. 62/925,717, filed on Oct. 24, 2019.

(51) Int. Cl.
    G01S 17/931     (2020.01)
    G01S 7/481     (2006.01)
    (Continued)

(52) U.S. Cl.
    CPC .......... G01S 17/931 (2020.01); G01S 7/4808 (2013.01); G01S 7/4817 (2013.01); G01S 17/34 (2020.01)

(58) Field of Classification Search
CPC ...... G01S 7/4808; G01S 7/481; G01S 7/4811; G01S 7/4814; G01S 7/4816; G01S 7/4817; G01S 7/487; G01S 7/4876; G01S 7/491; G01S 7/4911; G01S 7/4912; G01S 7/4913; G01S 7/4915; G01S 7/493; G01S 17/34;

(Continued)

(56) References Cited

U.S. PATENT DOCUMENTS 4,647,784 A *   3/1987   Stephens .............. G05D 1/0236
                                                                                                 250/559.3
5,539,562 A     7/1996   Morioka et al.
                  (Continued)

FOREIGN PATENT DOCUMENTS

JP         H0584882 U * 11/1993
JP       2013083624 A * 5/2013

OTHER PUBLICATIONS

International Search Report and Written Opinion in counterpart International Application No. PCT/US2020/056293, dated Feb. 24, 2021, 18 pages.

(Continued)

*Primary Examiner* — Yuqing Xiao
*Assistant Examiner* — Benjamin Richard Hebert
(74) *Attorney, Agent, or Firm* — Edell, Shapiro & Finnan, LLC

(57) ABSTRACT

According to one aspect, a relatively low-cost sensor for use on an autonomous vehicle is capable of detecting moving objects in a range or a zone that is between approximately 80 meters and approximately 300 meters away from the autonomous vehicle. A substantially single fan-shaped light beam is scanned for a full 360 degrees in azimuth. Using frequency-modulated-continuous-wave (FMCW) or phase coded modulation on the beam, with back end digital signal processing (DSP), moving objects may effectively be distinguished from a substantially stationary background.

24 Claims, 14 Drawing Sheets

(51) Int. Cl.
*G01S 7/48* (2006.01)
*G01S 17/34* (2020.01)

(58) Field of Classification Search
CPC .......... G01S 17/36; G01S 17/50; G01S 17/58; G01S 17/931
See application file for complete search history.

(56) References Cited

U.S. PATENT DOCUMENTS

| | | |
|---|---|---|
| 9,575,162 B2 | 2/2017 | Owechko |
| 10,220,778 B2 | 3/2019 | Tomioka |
| 2007/0215795 A1 | 9/2007 | Kameyama et al. |
| 2014/0111812 A1* | 4/2014 | Baeg .................. G01S 17/87 356/610 |
| 2016/0274589 A1 | 9/2016 | Templeton et al. |
| 2018/0136321 A1* | 5/2018 | Verghese .............. G01S 7/4868 |
| 2018/0284279 A1 | 10/2018 | Campbell et al. |
| 2019/0011558 A1* | 1/2019 | Crouch ................. G01S 7/4866 |
| 2019/0018108 A1 | 1/2019 | Gao et al. |
| 2019/0018109 A1 | 1/2019 | Gao et al. |
| 2019/0018416 A1* | 1/2019 | Gassend ............... G01S 17/931 |
| 2019/0056483 A1 | 2/2019 | Bradley et al. |
| 2019/0086518 A1* | 3/2019 | Hallstig ............... G01S 7/4863 |
| 2020/0003900 A1* | 1/2020 | Stochino .............. G01S 7/4802 |
| 2020/0150278 A1 | 5/2020 | Li et al. |
| 2020/0371212 A1* | 11/2020 | Rumala ................. G01S 7/4813 |

OTHER PUBLICATIONS

Partial International Search Report and Written Opinion in counterpart International Application No. PCT/US2020/056293, dated Dec. 21, 2020, 11 pages.

* cited by examiner

SINGLE BEAM DIGITALLY MODULATED LIDAR FOR AUTONOMOUS VEHICLE DISTANCE SENSING

CROSS REFERENCE TO RELATED APPLICATION

This application claims priority to U.S. Provisional Application No. 62/925,717, filed Oct. 24, 2019 the entirety of which is incorporated herein by reference.

TECHNICAL FIELD

The disclosure relates to autonomous vehicles and, more particularly, to sensors used in autonomous vehicles.

BACKGROUND

Light Detection and Ranging (lidar) is a technology that is often used in autonomous vehicles to measure distances to targets. Typically, a lidar system or sensor includes a light source and a target. The light source emits light towards a target that scatters the light. The detector receives some of the scattered light, and the lidar system determines a distance to the target based on characteristics associated with the received scattered light, or the returned light.

Lidar systems generate three-dimensional point clouds of a surrounding environment. While the point clouds are used to identify the location of obstacles, it is often difficult to determine the velocity of non-stationary obstacles using the point clouds.

DESCRIPTION OF EXAMPLE EMBODIMENTS

Overview

In one embodiment, a relatively low-cost lidar sensor is provided that is capable of detecting moving objects in a range or a zone that is between approximately 80 meters and approximately 300 meters away from the autonomous vehicle. A substantially single fan-shaped light beam is scanned for a full 360 degrees in azimuth. Using coherent detection, such as frequency-modulated continuous-wave (FMCW) or phase-coded modulation, on the beam with back end digital signal processing (DSP), moving objects may effectively be distinguished from a substantially stationary background. This lidar sensor is useful on a vehicle, such as, but not limited to an autonomous vehicle.

Example Embodiments

As the number of autonomous vehicles on roadways is increasing, the ability for autonomous vehicles to operate safely is becoming more important. For example, the ability of sensors used in autonomous vehicles to accurately identify obstacles and to determine the velocity at which non-stationary obstacles are moving is critical. In fact, this is important on non-autonomous vehicles that have some driver assistance capabilities.

In one embodiment, a sensor that is reliable, and relatively low cost, is capable of detecting moving obstacles that are between approximately 80 meters (m) and approximately 300 m away from the sensor. In some instances, the sensor may be arranged to detect moving obstacles that are between approximately 120 m and approximately 200 m away from the sensor. Such a sensor may be a lidar sensor that uses a single divergent, or fan-shaped, beam which is scanned substantially only in azimuth. When an autonomous vehicle is at a distance of between approximately 120 m and approximately 200 m away from an object, the autonomous vehicle is generally concerned with moving objects, and not as concerned with substantially stationary objects. As such, any potential inability to distinguish between objects at different elevations using a single divergent beam scanned substantially only in azimuth is generally not critical. For example, other sensors on an autonomous vehicle may be used to distinguish between objects at different elevations as the autonomous vehicle nears the objects.

Figure 1:
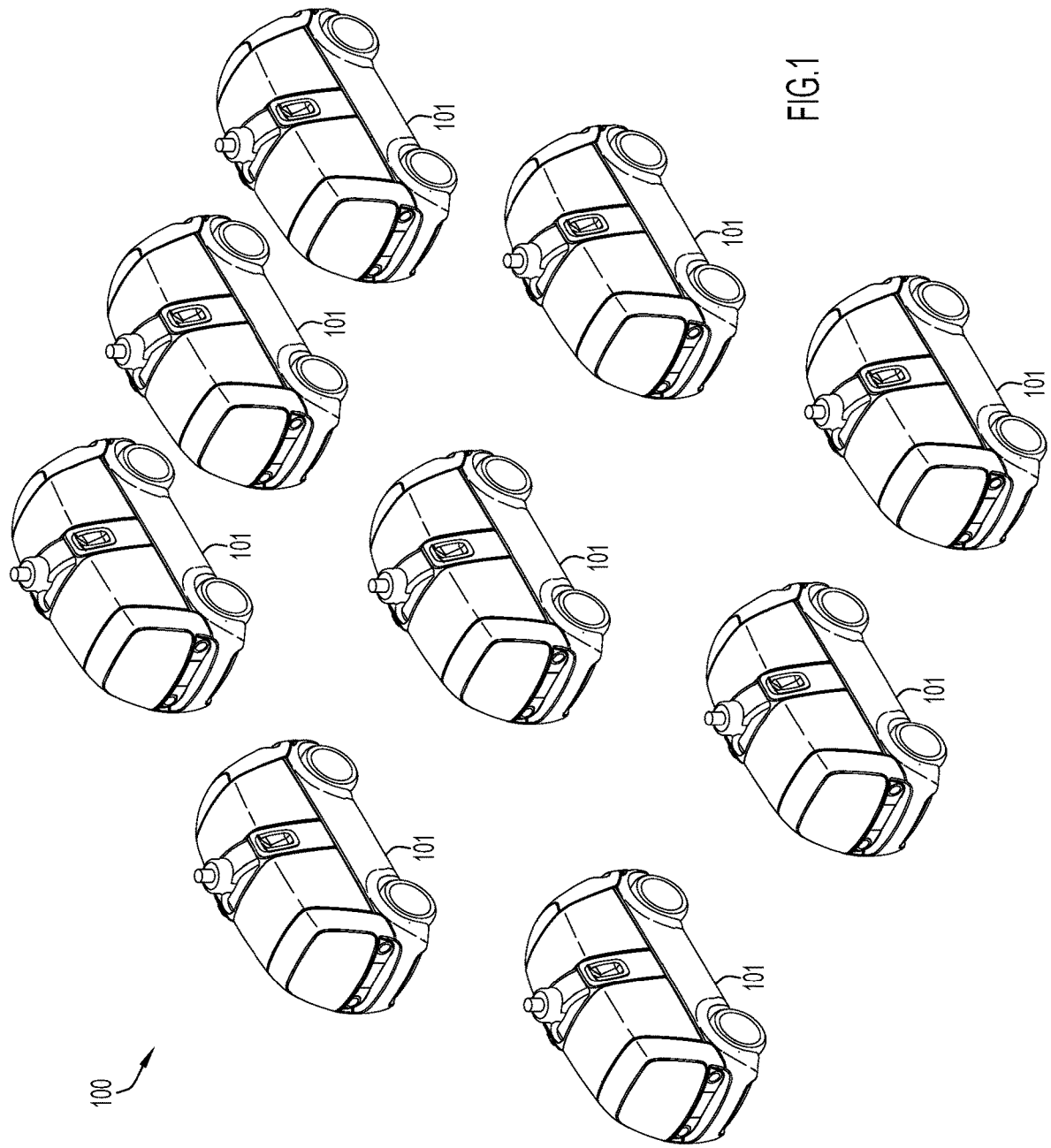
FIG. 1 is a diagrammatic representation of an autonomous vehicle fleet in accordance with an embodiment.

Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
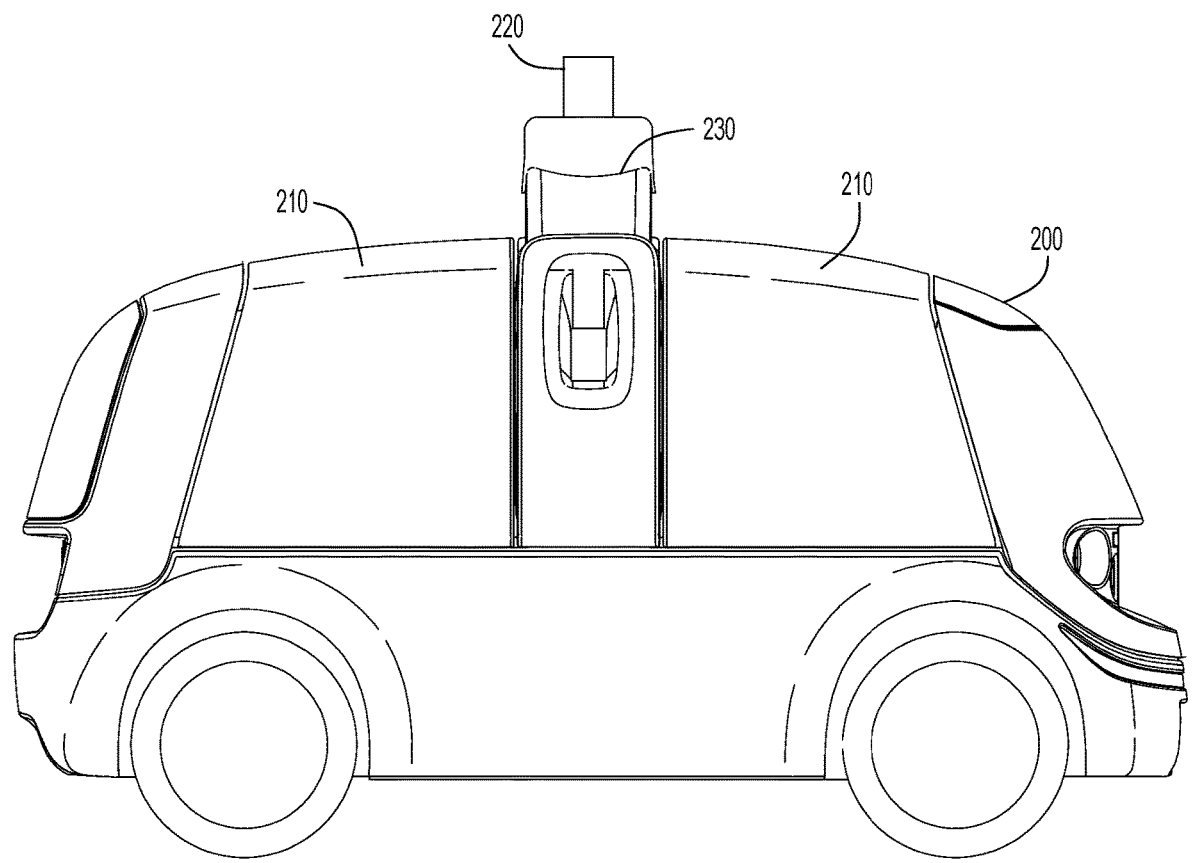
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis 200, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 210. Compartments 210 may be assigned to one or more entities, such as one or more customer, retailers, and/or vendors. Compartments 210 are generally arranged to contain cargo, items, and/or goods. Typically, compartments 210 may be secure compartments. It should be appreciated that the number of compartments 210 may vary. That is, although two compartments 210 are shown, autonomous vehicle 101 is not limited to including two compartments 210.

The autonomous vehicle 101 may further include a sensor pod 220 that is mounted on an arc structure 230 on the top of the autonomous vehicle 101.

Figure 3:
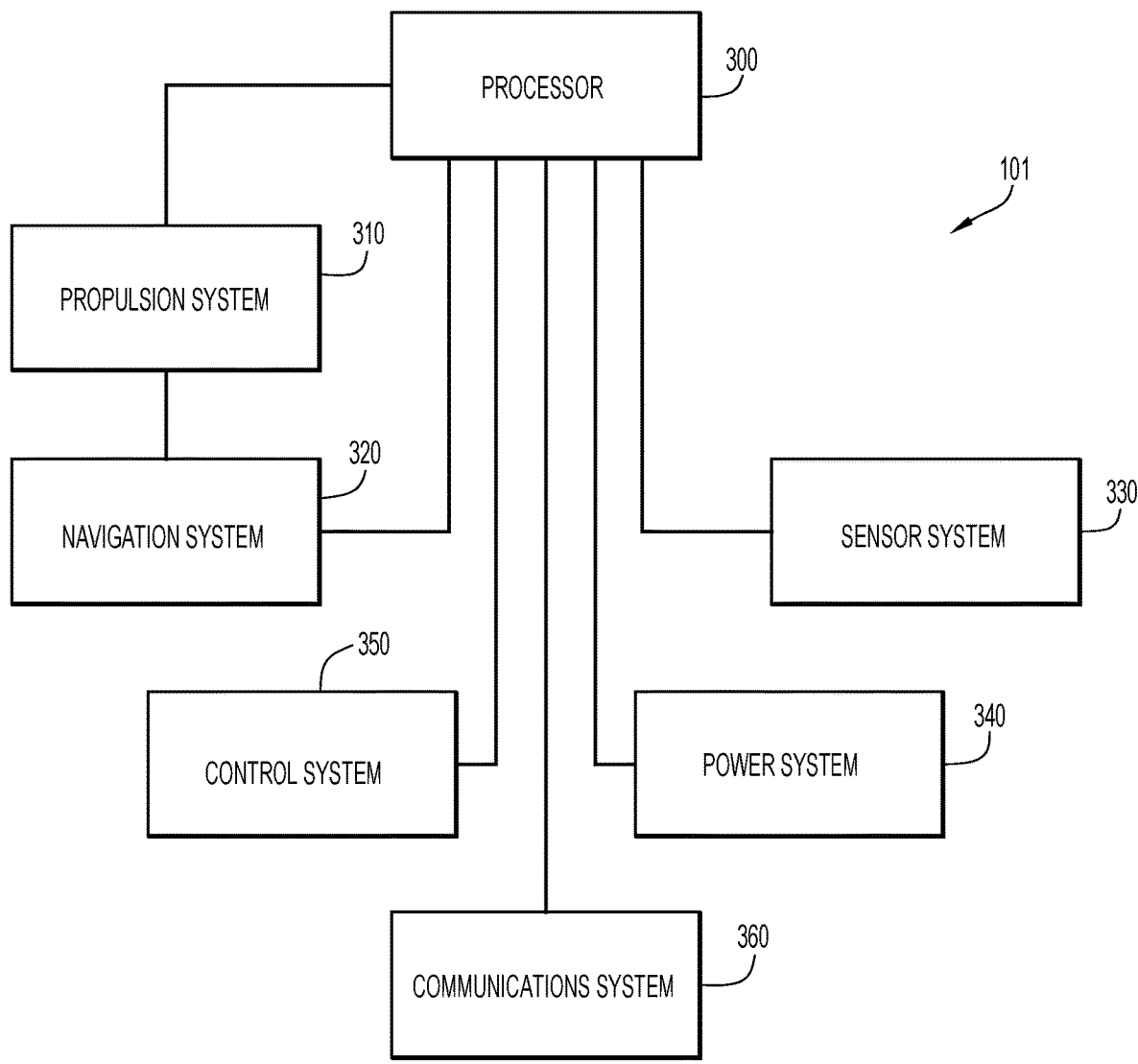
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 300, a propulsion system 310, a navigation system 320, a sensor system 330, a power system 340, a control system 350, and a communications system 360. It should be appreciated that processor 300, propulsion system 310, navigation system 320, sensor system 330, power system 340, and communications system 360 are all coupled to a chassis or body of autonomous vehicle 101.

Processor 300 is arranged to send instructions to and to receive instructions from or for various components such as propulsion system 310, navigation system 320, sensor system 330, power system 340, and control system 350. Propulsion system 310, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 310 may be arranged to cause the engine, wheels, steering, and braking systems to cooperate to drive. In general, propulsion system 310 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 320 may control propulsion system 310 to navigate autonomous vehicle 101 through paths and/or within unstructured open or closed environments. Navigation system 320 may include at least one of digital maps, street view photographs, and a global positioning system (GPS) point. Maps, for example, may be utilized in cooperation with sensors included in sensor system 330 to allow navigation system 320 to cause autonomous vehicle 101 to navigate through an environment. In one embodiment, navigation system 320 includes perception software.

Sensor system 330 includes any sensors, as for example lidar, radar, ultrasonic sensors, microphones, altimeters, and/or cameras. Sensor system 330 generally includes onboard sensors that allow autonomous vehicle 101 to safely navigate, and to ascertain when there are objects near autonomous vehicle 101. In one embodiment, sensor system 330 may include propulsion systems sensors that monitor drive mechanism performance, drive train performance, and/or power system levels. A lidar sensor included in sensor system 330 may be a lidar sensor that utilizes a single, substantially divergent beam that has an elevational component but is scanned substantially only in azimuth, as described in further detail below. Moreover, the lidar sensor used in sensor system 330 may employ modulation and demodulation techniques described in further detail below. One or more components of the sensor system 330 may reside in the sensor pod 220 shown in FIG. 2.

Power system 340 is arranged to provide power to autonomous vehicle 101. Power may be provided as electrical power, gas power, or any other suitable power, e.g., solar power or battery power. In one embodiment, power system 340 may include a main power source, and an auxiliary power source that may serve to power various components of autonomous vehicle 101 and/or to generally provide power to autonomous vehicle 101 when the main power source does not have the capacity to provide sufficient power.

Communications system 360 allows autonomous vehicle 101 to communicate, as for example, wirelessly, with a fleet management system (not shown) that allows autonomous vehicle 101 to be controlled remotely. Communications system 360 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In a range of between approximately 80 m to approximately 300 m away from an autonomous vehicle, autonomous vehicle perception software is much more concerned with the azimuth of objects than with the elevation of objects. Thus, rather than use data obtained from a lidar sensor to create a point cloud by scanning a narrow beam in both azimuth and elevation, a substantially two-dimensional (2D) point cloud may be created by scanning a single, divergent beam substantially only in azimuth. Each point in a 2D point cloud may have an x-coordinate and a y-coordinate, and the 2D point cloud may be drawn on a flat map. The divergent beam may be a fan-shaped beam. In one embodiment, the beam is diverged or defocused in an elevation direction, and is relatively tightly focused in an azimuth direction.

It has been determined that for certain applications, such as vehicle-based applications, it is not necessary to have such a large amount of data for purposes of ranging of objects approximately 80-200 m from the vehicle. Moreover, for some applications, it is not necessary to determine the full three-dimensional shape of objects in vicinity of the lidar sensor, rather it is sufficient to determine that there is an object moving relative to the lidar sensor, and the velocity at which the object is moving.

There is a trend in the development of lidar sensors to improve their range and point-cloud density capabilities. However, these lidar sensors tend to be quite expensive and can generate a large amount of point-cloud data, which as a result, requires expensive processing capabilities to process the point-cloud data.

Figure 4A:
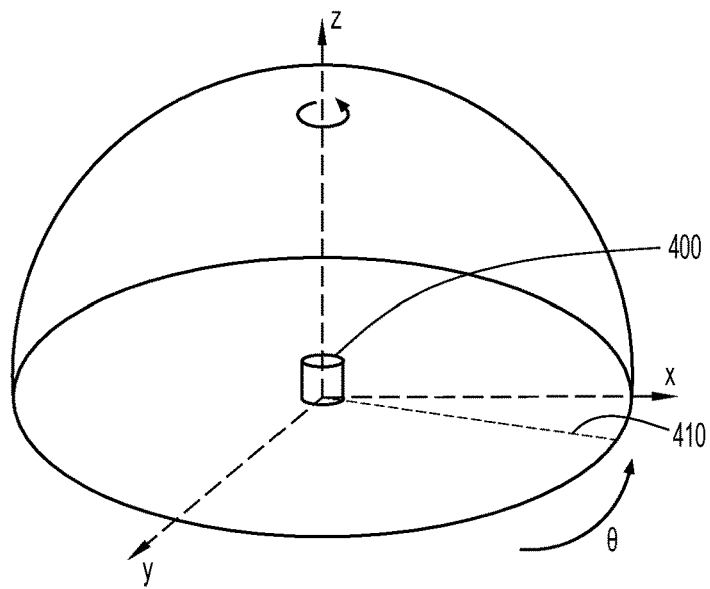
FIG. 4A is a diagrammatic representation of a single beam that is scanned substantially only in azimuth in accordance with an embodiment.

FIG. 4A is a diagrammatic representation of a single beam that is scanned substantially only in azimuth in accordance with an embodiment. As shown, a lidar sensor 400 is configured to generate a single beam 410 that is arranged to scan with respect to a z-axis. Lidar sensor 400 may be a single beam digitally modulated lidar sensor. Typically, single beam 410 may scan approximately 360 degrees with respect to the z-axis. That is, an overall scanning angle θ may be approximately 360 degrees.

Beam 410 is shown in an xy-plane for ease of illustration, i.e., beam 410 is shown as including an azimuthal component. Beam 410 may have any suitable operating wavelength, e.g., an operating wavelength of approximately 1550 nanometers.

Figure 4B:
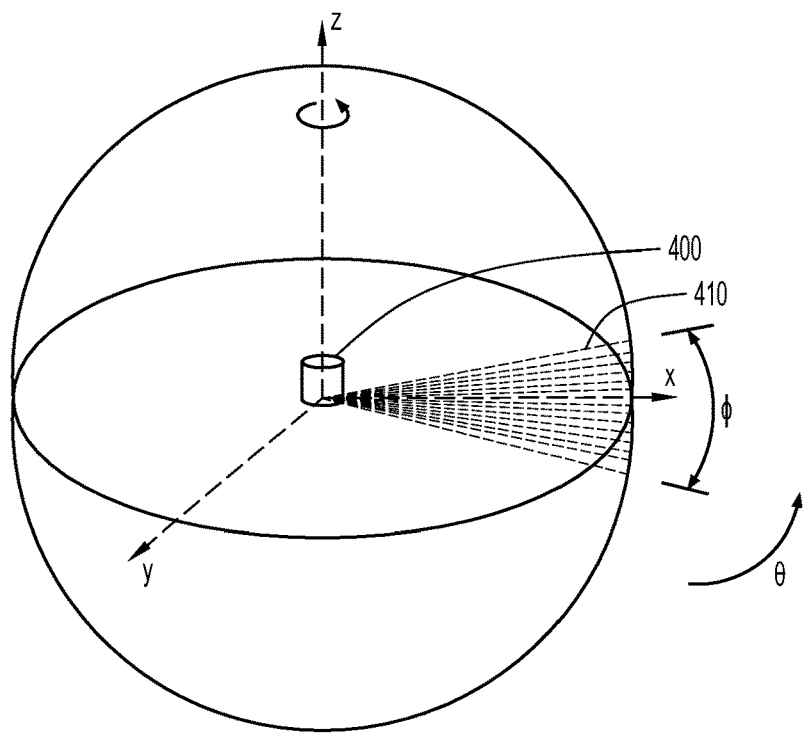
FIG. 4B is a diagrammatic representation of a single divergent beam that has a component in elevation and is scanned substantially only in azimuth in accordance with an embodiment.

In general, beam 410 is a divergent beam and has an elevational component in addition to an azimuthal component. FIG. 4B is a diagrammatic representation of a single divergent beam that has a component in elevation and is scanned substantially only in azimuth in accordance with an embodiment. Lidar sensor 400 is arranged to produce a single divergent beam 410' that is scanned about a z-axis. Beam 410' is substantially fan-shaped, and has an elevational component. In one embodiment, the elevational component of beam 410' is an angle φ that is in a range of between approximately −10 degrees and approximately 10 degrees. Beam 410' may have any suitable operating wavelength, e.g., an operating wavelength of approximately 1550 nanometers.

Figure 5:
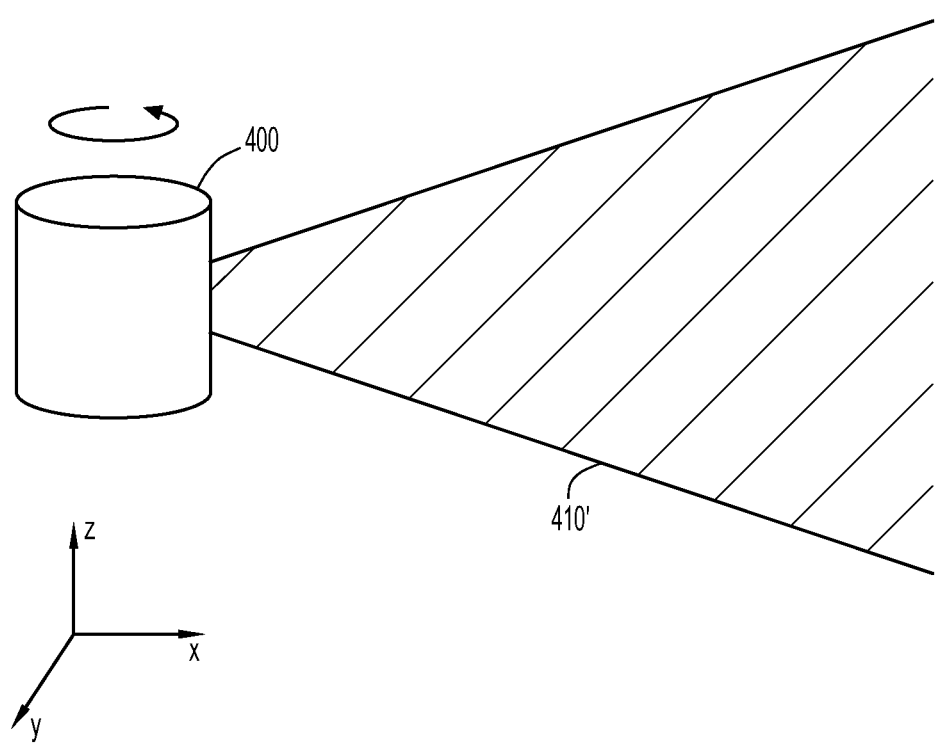
FIG. 5 is a diagrammatic representation of a lidar sensor that emits a divergent beam in accordance with an embodiment.

FIG. 5 illustrates the single divergent or fan-shaped beam 410' that may be generated by the lidar sensor 400. One advantage of the single divergent beam 410' is that a single instance of modulation, demodulation, and related signal processing resources may be used. Thus, there are cost and simplicity advantages to this approach.

Divergent beam 410' may, in one embodiment, be a substantially flat fan or sheet of light that is illuminated substantially simultaneously. That is, divergent beam 410' may be a single sheet of light that is effectively flashed as one beam, rather than being divided into multiple beams that are narrow in elevation.

When a single light beam is used for a full 360-degree scan in azimuth, substantially only a single copy of a lidar modulator, demodulator, and signal processing chain may be used. As a result, scanning may be provided at a desired scan rate at a lower cost, for example, than systems that scan narrow light beams in both azimuth and elevation.

Whereas newer high-resolution lidar sensors may have multiple beams that cover a fan shape in elevation, the lidar sensor arrangement depicted in FIGS. 4A, 4B and 5 involves a single beam that covers a fan shape in elevation. A lidar sensor that employs a single divergent beam generates one measurement for each intersection event of the beam by an object, which reduces the complexity of the computations needed to be performed on returned light. The lidar sensor 400 may be rotated about a circle, such as around a vehicle, at a rate of approximately 10 rotations/sec. This is sufficient to determine that there is an object moving with respect to the lidar sensor, and at what velocity the object is moving relative to the lidar sensor (or relative to a vehicle on which the lidar sensor is mounted).

Figure 6:
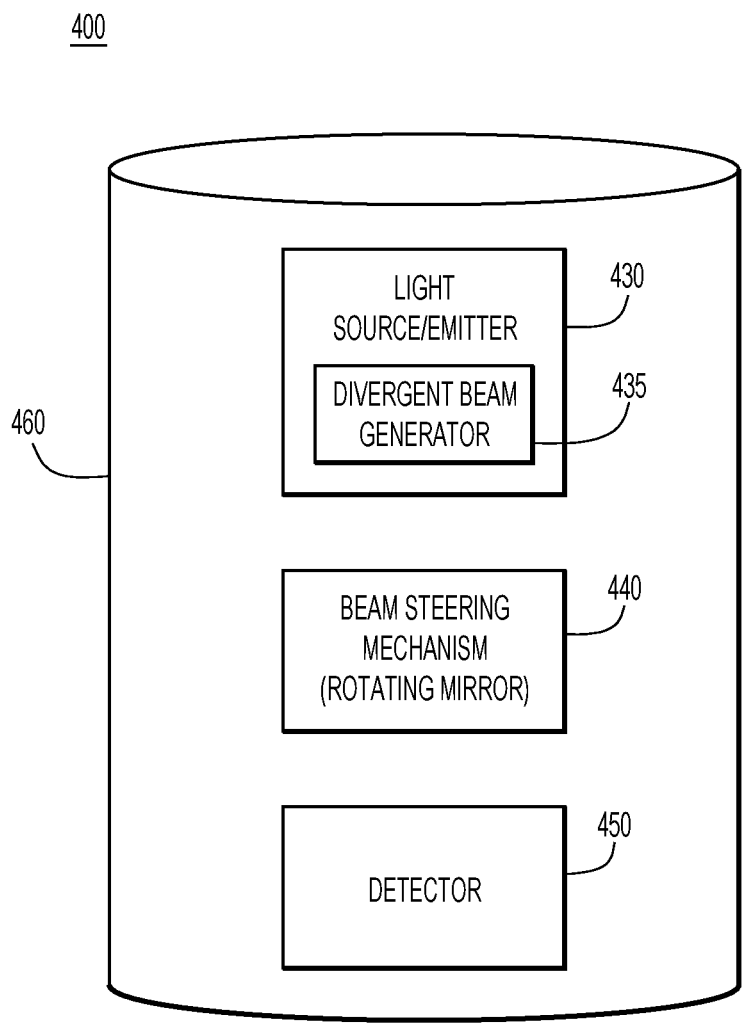
FIG. 6 is a block diagram representation of a lidar sensor in accordance with an embodiment.

FIG. 6 is a block diagram representation of lidar sensor 400 capable of scanning a beam substantially only in azimuth in accordance with an embodiment. The lidar sensor 400 includes a light source or emitter 430 that includes a divergent beam generator 435, a beam steering mechanism 440, a detector 450, and a housing 460. As will be appreciated by those skilled in the art, lidar sensor 400 may include many other components e.g., lenses such as a receiving lens. Such various other components are not shown in FIG. 6 for simplicity.

Light emitter 430 may generally emit a light at any suitable wavelength, e.g., a wavelength of approximately 1550 nanometers. It should be appreciated that a wavelength of approximately 1550 nanometers may be preferred for reasons including, but not limited to including, eye safety power limits and wide availability of 1550 nanometer lasers. In general, however, suitable wavelengths may vary widely.

Light source 430 may include the divergent beam generator 435. In one embodiment, divergent beam generator 435 may create a single divergent beam, and light source 430 may be substantially rigidly attached to a surface, e.g., a surface of an autonomous vehicle, through housing 460. In other words, light source 430 may be arranged not to rotate.

Beam steering mechanism 440 is arranged to steer a beam generated by divergent beam generator 435. In one embodiment, beam steering mechanism 440 may include a rotating mirror that steers a beam substantially only in azimuth, e.g., approximately 360 degrees in azimuth. Beam steering mechanism may be arranged to rotate clockwise and/or counterclockwise. The rotational speed of beam steering mechanism 440 may vary widely. The rotating speed may be determined by various parameters including, but not limited to including, a rate of detection, and/or field of view.

Detector 450 is arranged to receive light after light emitted by light source 430 is reflected back to lidar sensor 400. Housing 460 is arranged to contain light source 430, beam steering mechanism 440, and detector 450. The detector 450 may be, for example, a photodiode or an array of photodiodes or other suitable photosensor arrangement.

Figure 7:
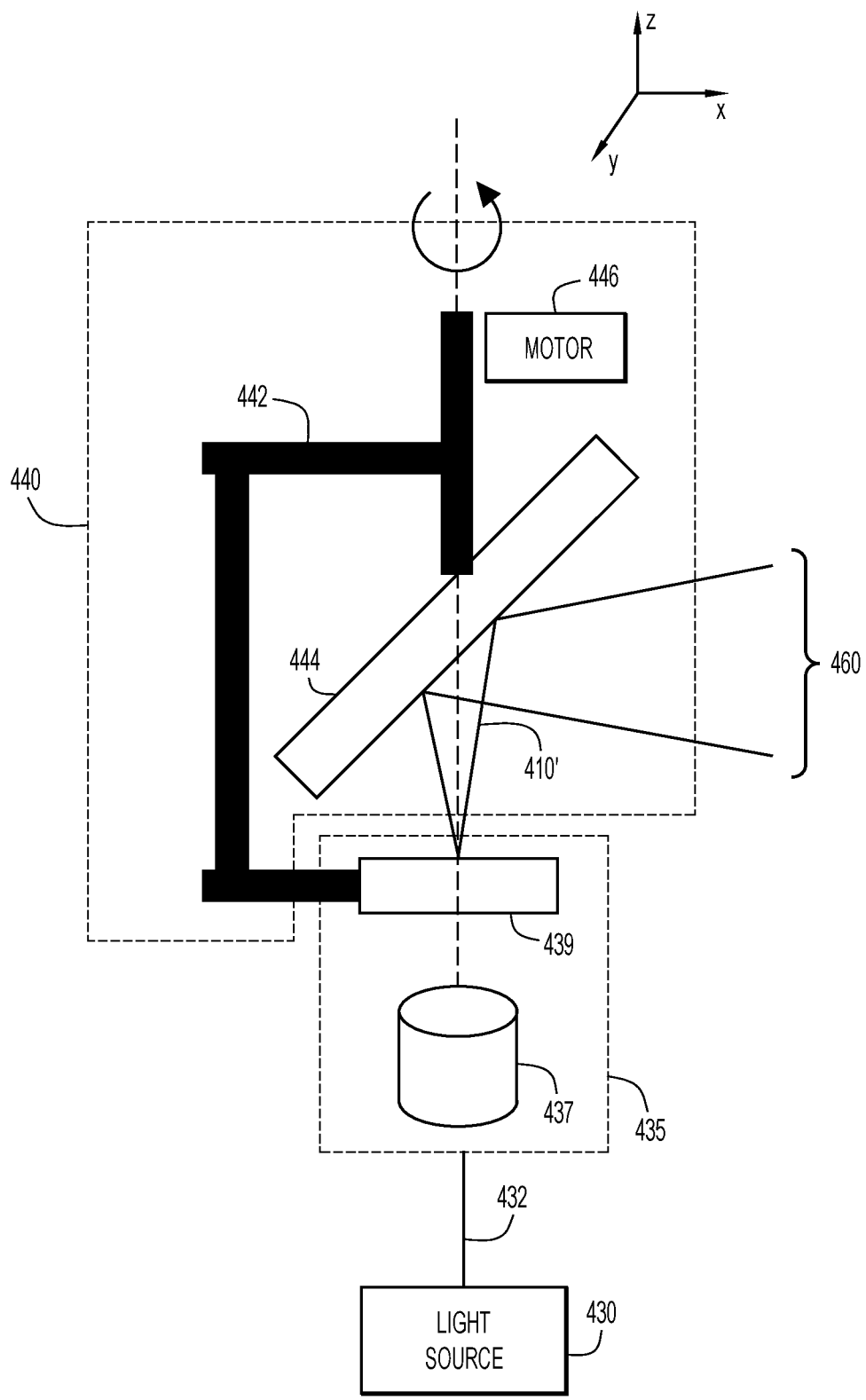
FIG. 7 is a schematic diagram of a beam steering mechanism according to an example embodiment.

Reference is now made to FIG. 7 for a more detailed description of the lidar sensor 400 in more detail, and in particular further details of the light source 430, divergent beam generator 435 and beam steering mechanism 440, according to an example embodiment. Light from light source 430 is directed into an optical fiber 432 that in turn is coupled to the divergent beam generator 435. The divergent beam generator 435 includes a collimation lens 437 and a divergence lens 439. The collimation lens 437 narrows the light carried from the light source 430 on the optical fiber 432 and the divergence lens 439 diverges collimated light from the collimation lens 437 to produce the single divergent beam 410'.

The beam steering mechanism 440 may include a rotating structure 442 to which is attached a mirror 444. In addition, the divergence lens 439 is attached to the rotating structure 442. An electric motor 446 is coupled to the rotating structure 442 to rotate the rotating structure 442 in the direction of the arrow shown in FIG. 7. The mirror 444 reflects the single divergent beam 410' to produce a reflected single divergent beam 410' that spans an elevation relative to the xy-plane and is rotated in the azimuth direction (relative to the z-axis) as the motor 446 rotates the rotating structure 442 to which the mirror 444 and divergence lens 439 are mounted.

In one form, the mirror 444 may be a flat mirror. In another form, the mirror 444 is a curved mirror, in which case the divergence function of the divergence lens 439 may be performed by the mirror 444. Thus, the only components that rotate are the mirror 444 and the divergence lens 439, or in one variation, only a curved mirror rotates. The light source 430, optical fiber 432 and collimation lens 437 need not rotate.

The arrangement depicted in FIG. 7 may achieve a 360 degree rotational scan, and as fast as 600 rpm (10 cycles/sec). No active components are in motion, and there is no need for any vertical scanning (in elevation) since the beam already has a diverging pattern in elevation. Further still, there are no Doppler effects introduced by the mirror rotation.

Figure 8A:
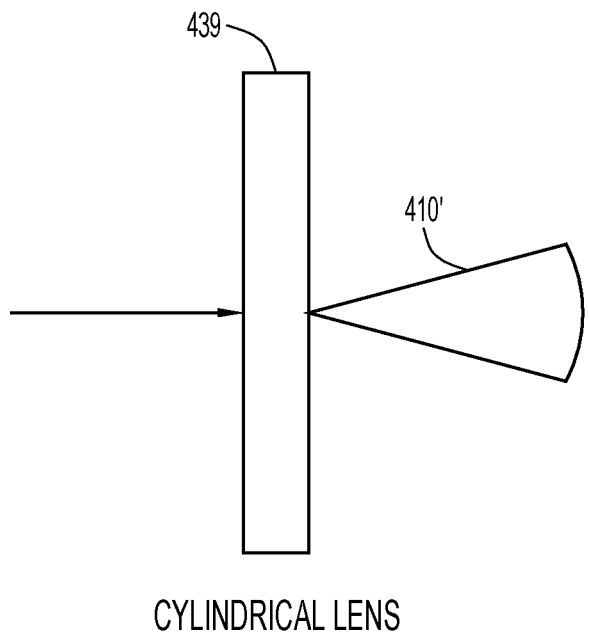
FIG. 8A is a diagram of a cylindrical lens that may be used as part of the beam steering mechanism of FIG. 7, according to an example embodiment.

FIG. 8A shows that the divergence lens 439 may be a cylindrical lens. The divergence lens 439 receives a narrow beam of light and produces the divergent beam 410'.

Figure 8B:
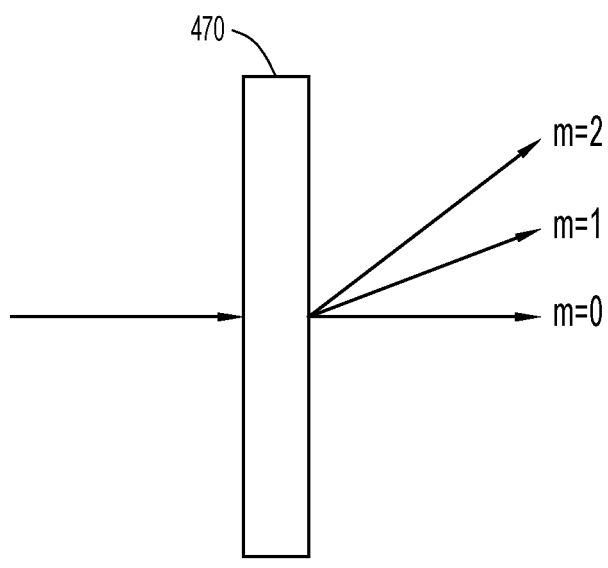
FIG. 8B is a diagram of a diffraction grating that may be used as part of the beam steering mechanism of FIG. 7, according to an example embodiment.

FIG. 8B shows still another variation in which a diffraction grating 470 is used instead of a divergence lens. The diffraction grating 470 may take the form of a microscopic grid of wires. The diffraction grating 470 is a passive optical device in which light going in one end emerges out the other end with its properties changed. The diffraction grating 470 produces divergence only where selected exit angles are represented by beam power, rather than the continuum of angles provided by a cylindrical lens, for example.

Further still, an optical prism may be used instead of a divergence lens or diffraction grating, in order to generate the diverging beam pattern.

In general, a mechanism that allows a beam associated with a lidar sensor to be scanned substantially only in azimuth may be less complex than a mechanism which allows for both azimuthal and elevational scanning. For example, in order to support scanning substantially only in azimuth, because no elevational scanning is supported, a relatively simple rotating mirror may be used to support scanning.

Supporting substantially only azimuthal scanning allows issues associated with rotating joints, e.g., issues associated with power and/or data transfer across rotating joints, to be avoided.

Figure 9:
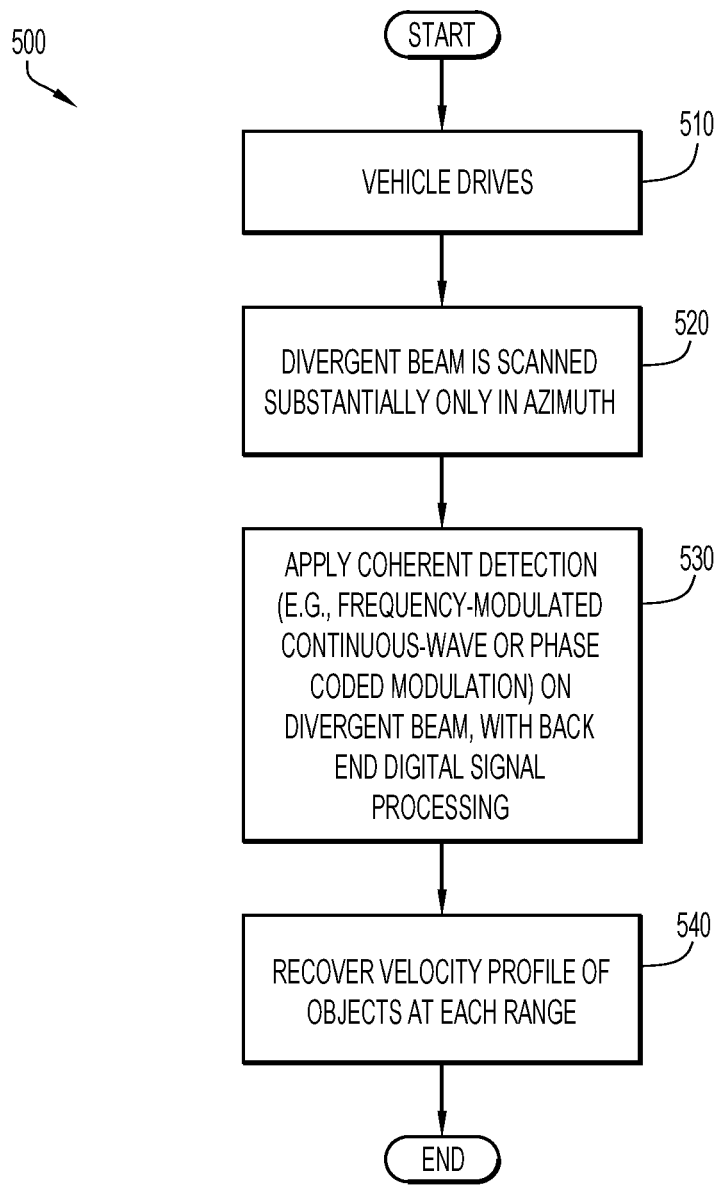
FIG. 9 is a process flow diagram for a method of using a single beam digitally modulated lidar in accordance with an example embodiment.

FIG. 9 is a process flow diagram that illustrates a method 500 of using a single beam digitally modulated lidar, e.g., a single fan-shaped beam, to facilitate the detection of moving objects in accordance with an example embodiment. The method 500 begins at operation 510 in which vehicle, e.g., an autonomous vehicle, on which the lidar is mounted, drives. As the vehicle drives, or is otherwise propelled, the lidar sensor scans a divergent beam, or a fan-shape beam, substantially only in azimuth, in operation 520. It should be appreciated that the divergent beam generally has an elevational component, but is scanned substantially only in azimuth. In one embodiment, scanning the single, divergent beam substantially only in azimuth allows for the creation of a 2D point cloud and the detection of moving objects within a range or zone, e.g., within a zone that is between approximately 80 m and approximately 300 m away from the vehicle.

At operation 530, coherent detection is applied returned light from the single divergent beam. Applying coherent detection may include, but is not limited to, applying a frequency-modulated continuous-wave (FMCW) or a phase-coded modulation to the single divergent beam. In addition, back end digital signal (baseband demodulation) processing may be applied as appropriate. That is, baseband modulation and baseband demodulation/digital signal processing may be applied to the single divergent beam. The application of FMCW or phase coded modulation, in addition to back end signal processing, allows the velocity profile of objects at each range to be recovered in operation 540. Further details about the modulation of the light beam and digital signal processing of returned light are described below. Once the velocity profile of the objects is recovered, the method of using a single beam digitally modulated lidar is completed.

Coherent detection enables direct measurement of an objected detected by the single divergent beam. That is, by modulating the light beam that is sent into a target area, the velocity of any detected object can be determined by observing how the light beam intersects with surfaces of the object and changes the modulation of returned light from the object. Therefore, there is no need to rescan the object and perform complex computations on the point-cloud to determine velocity of the object. In a few msec (ms), and one scan, it is possible to determine the direction of movement and velocity of an object.

Figure 10:
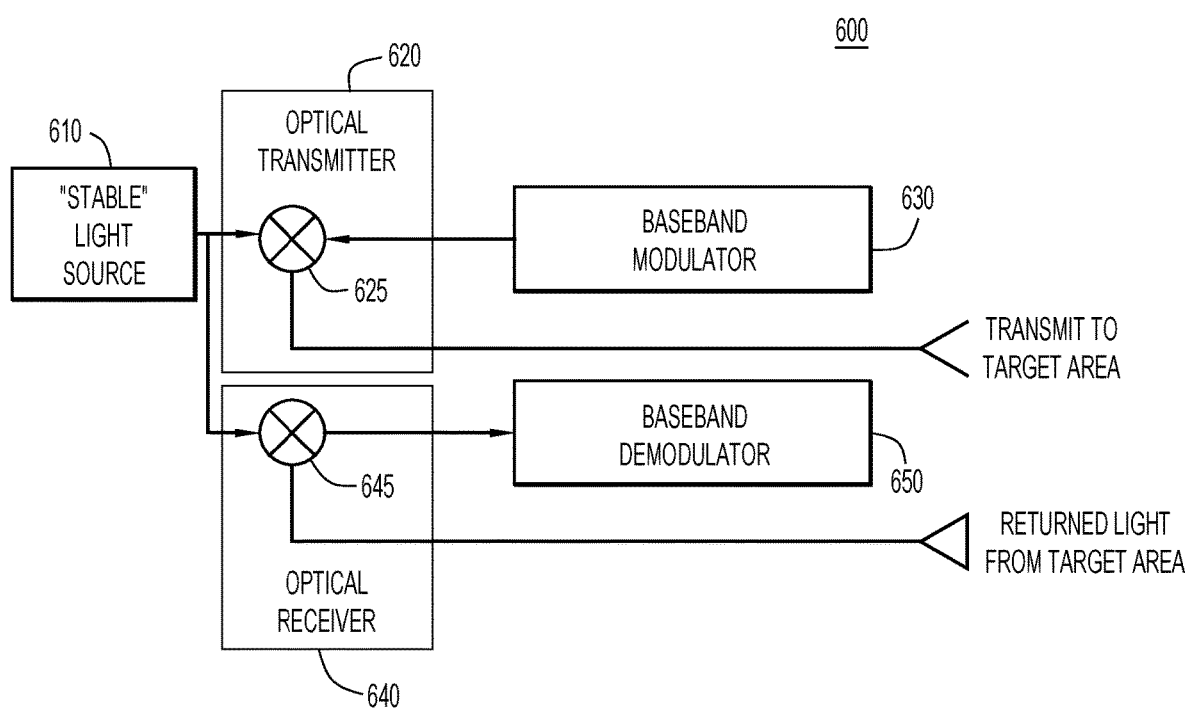
FIG. 10 is a block diagram representation of a lidar sensor system that uses baseband modulation and baseband demodulation in accordance with an example embodiment.

Referring next to FIG. 10, a system 600 is shown that uses baseband modulation and baseband digital signal processing techniques in connection with a lidar sensor, in accordance with an embodiment. The system 600 generally includes a "stable" light source 610, or a light source that produces a beam of light with a relatively narrow line width. Stable light source 610 may produce a beam of light that may be a single divergent beam as described above in connection with FIGS. 1-9, or in general, any light beam (e.g., non-divergent light beam). That is, the system 600, and its variations depicted in FIGS. 11 and 12, may be used with any type of light beam for one-dimensional lidar, two-dimensional lidar as well as three-dimensional lidar.

The system 600 further includes an optical transmitter 620, a baseband modulator module/block 630, an optical receiver 640 and a baseband demodulator (digital signal processing) module/block 650. The optical transmitter 620 includes an optical mixer 625 that mixes the light beam from the light source 610 with a baseband modulated light beam to impose baseband modulation on the light beam from the light source 610. The baseband modulation may be in the form of FMCW, phase coded modulation or any other suitable modulation scheme now known or hereinafter developed. Thus, baseband modulation is effectively applied to a light beam that is transmitted into a target area. The modulated light beam may be a single divergent (fan-shaped) beam that is scanned in an azimuth direction, as described above, or any type of beam.

Returned light from the target area is received (e.g., by a suitable photodetector) and directed to optical receiver 640. The optical receiver 640 includes an optical mixer 645 that mixes the returned light with light from the light source 610 and the mixed light output of the mixer 645 is (digitized) and supplied to baseband demodulator block 650.

Traditional lidar sensors illuminate a target area with light pulses (turned on and off) and evaluate roundtrip time of light. Coherent detection is different. In the system 600, the stable light source 610 is continuously on (no pulsing) and the light beam is mixed with a baseband modulation and then sent into a target area. The differences between characteristics of the modulation applied on the transmitted beam and the modulation detected on the returned light are used to directly determine movement (velocity) of a detected object. There is no need to perform roundtrip timing analysis between light pulses because the timing aspects are determined by the differences in transmitted modulation and received modulation.

The system 600 may achieve greater sensitivity, allowing for greater range of detection (with lower levels of light), and to directly determine velocity of an object from a single scan event.

The use of coherent detection in the manner depicted by FIG. 10 may be applied to any light beam structure, and is not limited to use with the single divergent beam structure described herein. However, a more robust lidar sensor may be realized by combining the single divergent light beam with the coherent detection aspects depicted in FIG. 10.

While system 600 is one example of a suitable coherent lidar signal processing chain, it should be appreciated that many other coherent lidar signal processing chains may be implemented. Other examples of suitable coherent lidar signal processing chains are be described below with reference to FIGS. 11-13.

Figure 11:
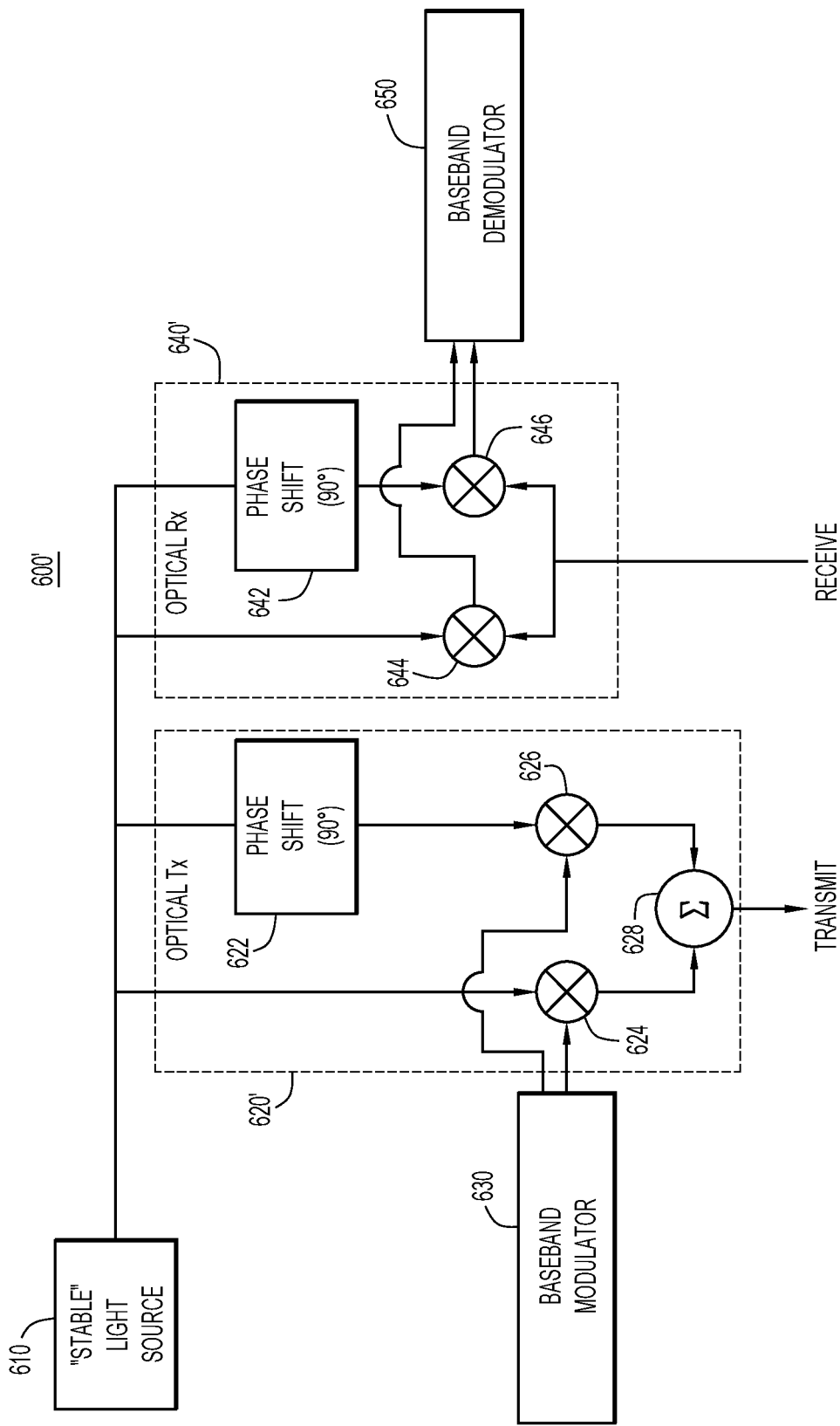
FIG. 11 is a block diagram representation of a lidar sensor system that uses baseband modulation and baseband demodulation in accordance with another example embodiment.

FIG. 11 shows another suitable coherent lidar signal processing system 600' that uses baseband modulation and baseband digital signal processing, in accordance with an example embodiment. System 600' is similar to system 600 of FIG. 11, except that the optical transmitter 620' and optical receiver 640' include additional components instead of a single mixer. The system 600' employs in-phase and quadrature optical beam components in the optical transmitter 620' and optical receiver 640'. Specifically, the optical transmitter 620' includes a phase shifter 622, first and second mixers 624 and 626, respectively, and an optical combiner/summer 628. Similarly, the optical receiver 640' includes a phase shifter 642 and first and second mixers 644 and 646, respectively.

In the transmit path, the light beam from the stable light source 610 is coupled to the phase shifter 622 and to the first mixer 624 of the optical transmitter 620'. The phase shifter 622 shifts the phase of the light beam from the light source 610 by approximately ninety (90) degrees, for example, and supplies the resulting phase shifted light beam to the second mixer 626. The baseband modulator block 630 applies baseband modulation to the light beam from the light source 610 at first mixer 624. First mixer 624 outputs a first modulated light beam and corresponds to an in-phase beam component. The baseband modulator block 630 also applies baseband modulation to the phase shifted light beam at second mixer 626, and second mixer 626 outputs a second modulated (phase shifted) light beam, and corresponds to a quadrature beam component. The optical combiner/summer 628 combines the first modulated (in-phase) light beam from first mixer 624 and the second modulated (quadrature) light beam from second mixer 626 to produce a modulated transmit beam that is directed to a target area.

In the receive path, the light beam from the light source 610 is coupled to the phase shifter 642 and to the first mixer 644 of the optical receiver 640'. The phase shifter 642 shifts the phase of the light beam from the light source 610 by approximately ninety (90) degrees to produce a phase shifted light beam. The first mixer 644 mixes received/returned light from the target area with the light beam from the light source 610 and supplies the resulting first returned (in-phase) light beam to the baseband demodulator block 650. The second mixer 646 mixes the received/returned light from the target area with the phase shifted light beam and supplies the resulting second returned (quadrature) light beam to the baseband demodulator block 650. The baseband demodulator block 650 demodulates the outputs from the first and second mixers 644 and 646, respectively. The differences between the baseband modulation applied in the transmit path by the baseband modulation block 630 and the baseband modulation on the outputs from the first and second mixers 644 and 646, respectively, may be analyzed to determine presence of an object in the target area and velocity of the object.

Figure 12:
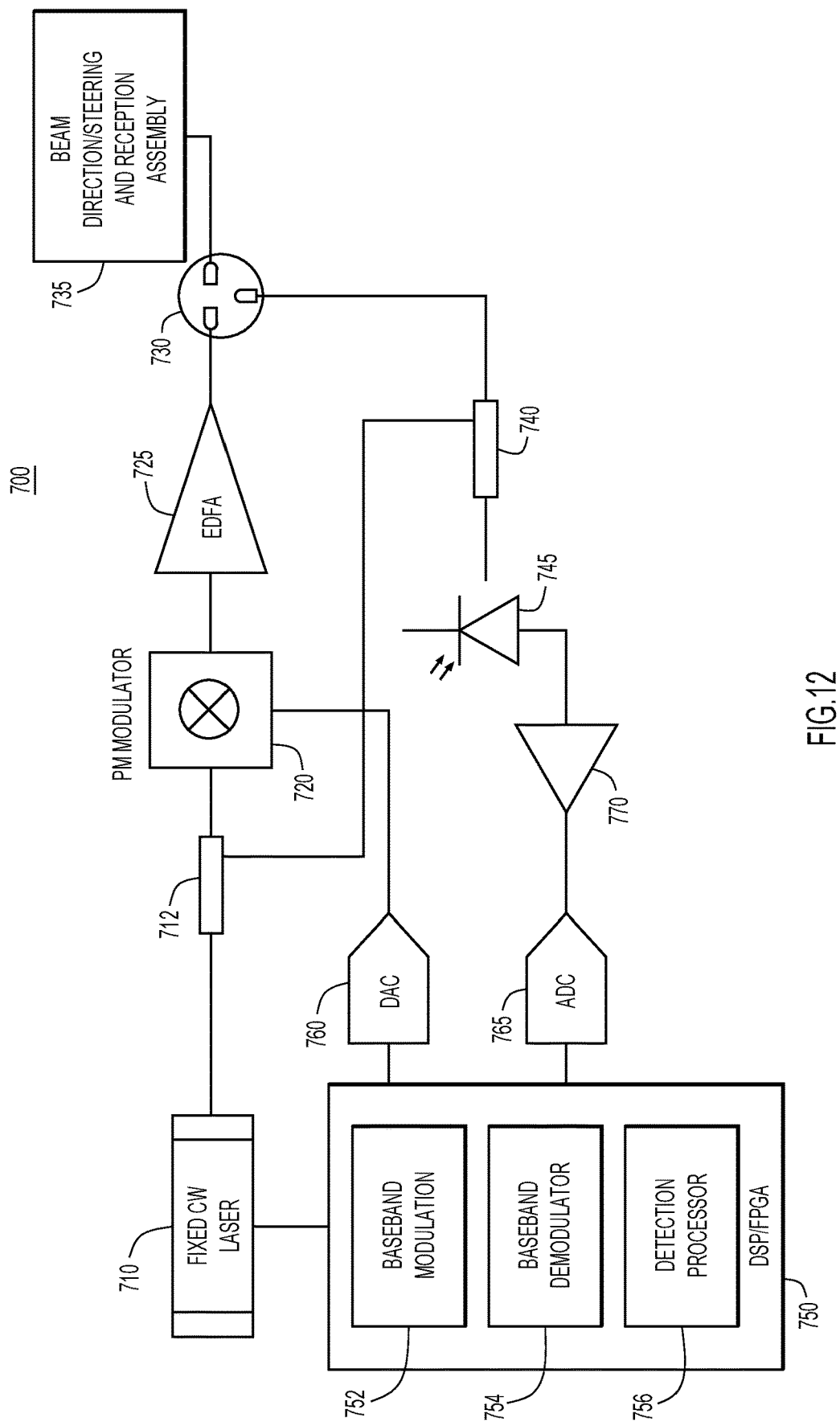
FIG. 12 is a block diagram of a lidar sensor system according to yet another example embodiment.

Turning now to FIG. 12, a block diagram is shown of a lidar sensor system 700 according to another example embodiment. The lidar sensor system 700 includes a fixed/stable continuous wave (CW) laser 710, an optical splitter 712, an optical phase modulation (PM) modulator 720, an optical amplifier 725 (such as an erbium doped fiber amplifier (EDFA)), an optical coupler 730, a beam direction/steering and reception assembly 735, an optical coupler/combiner 740, and a photodetector 745. The lidar sensor system 700 further includes a controller 750 that in turn includes a baseband modulator block 752, a baseband demodulator block 754, a detection processor block 756, a digital-to-analog converter (DAC) 760, an analog-to-digital converter (ADC) 765 and an amplifier 770. The DAC 760 converts the digital baseband modulation produced by the baseband modulator block 752 to an analog signal that is supplied to the PM modulator 720. The ADC 765 converts the analog receive signal at the output of the amplifier 770 to a digital signal and directs it to the baseband demodulator block 754. The controller 750 may be implemented in digital signal processor (DSP) that includes fixed or programming digital logic gates, such as in a Field Programming Gate Array (FPGA).

In the lidar sensor system 700, the optical splitter 712, optical PM modulator 720, and optical amplifier 725 form an optical transmitter. Similarly, the optical combiner 740 and photodetector 745 form an optical receiver.

The fixed CW laser 710 provides a continuation light beam, of a suitable wavelength, to the optical splitter 712. The optical splitter 712 splits the light beam and directs it to both the optical PM modulator 720 and to the optical coupler/combiner 740. As described further below, the unmodulated light beam directed by the optical splitter 712 to the optical coupler/combiner 740 is used as a reference with respect to the received/return light.

The optical PM modulator 720 applies phase modulation to the light beam according to the baseband modulation contained in output of the DAC 760, to produce a phase modulated light beam. The optical amplifier 725 amplifies the phase modulated light beam, that is then coupled to the optical coupler 730, which in turn directs the amplified phase modulated light beam to the beam direction/steering and reception assembly 735. The beam direction/steering and reception assembly 735 sends the amplified phase modulated light beam to the target area and collects returned/received light from the target area. In one example, the light beam may be a single divergent light beam as described above, and the beam direction/steering and reception assembly 735 may take the form of the beam steering mechanism described above in connection with FIGS. 7, 8A and 8B.

The received/returned light is directed by the optical coupler 730 to the optical combiner 740. The optical combiner 740 combines the unmodulated light beam from the fixed CW laser 710 with the received/returned light, and the resulting combined light beam is detected by the photodetector 745. In one form, the optical combiner 740 may include a direct downmixing path and a phase shifted downmixing path, similar to that in FIG. 11.

The photodetector 745 converts the combined light beam to an electrical receive signal. The amplifier 770 amplifies the electrical receive signal and supplies an amplified electrical receive signal to the ADC 765. The ADC 765 converts the amplified electrical receive signal to a digital receive signal for processing by the baseband demodulator block 754 and by the detection processor 756. The baseband demodulation block 754 performs baseband demodulation of the digital receive signal, including dechirping in the digital domain, in order to recover the baseband modulation on the returned light. The detection processor 756 analyzes/compares the modulation recovered in the digital receive signal with the modulation generated by the baseband modulation block 752. For example, the detection processor 756 may analyze the differences between the modulation applied to the light beam that is transmitted into the target area and the modulation recovered in the digital receive signal to determine velocity of a moving object in the target area of the lidar sensor system 700.

Unlike a conventional optical communication system in which node is not attempting to receive the same optical beam that it transmitted, in a lidar sensor system, the received signal is derived from the transmitted signal. In other words, a lidar sensor is looking for returned light from a target area that results from the reflection/scattering of the light that the sensor transmits into the target area. A lidar sensor uses the received light to estimate the range and velocity of an object reflecting light transmitted from the lidar sensor.

Figure 13:
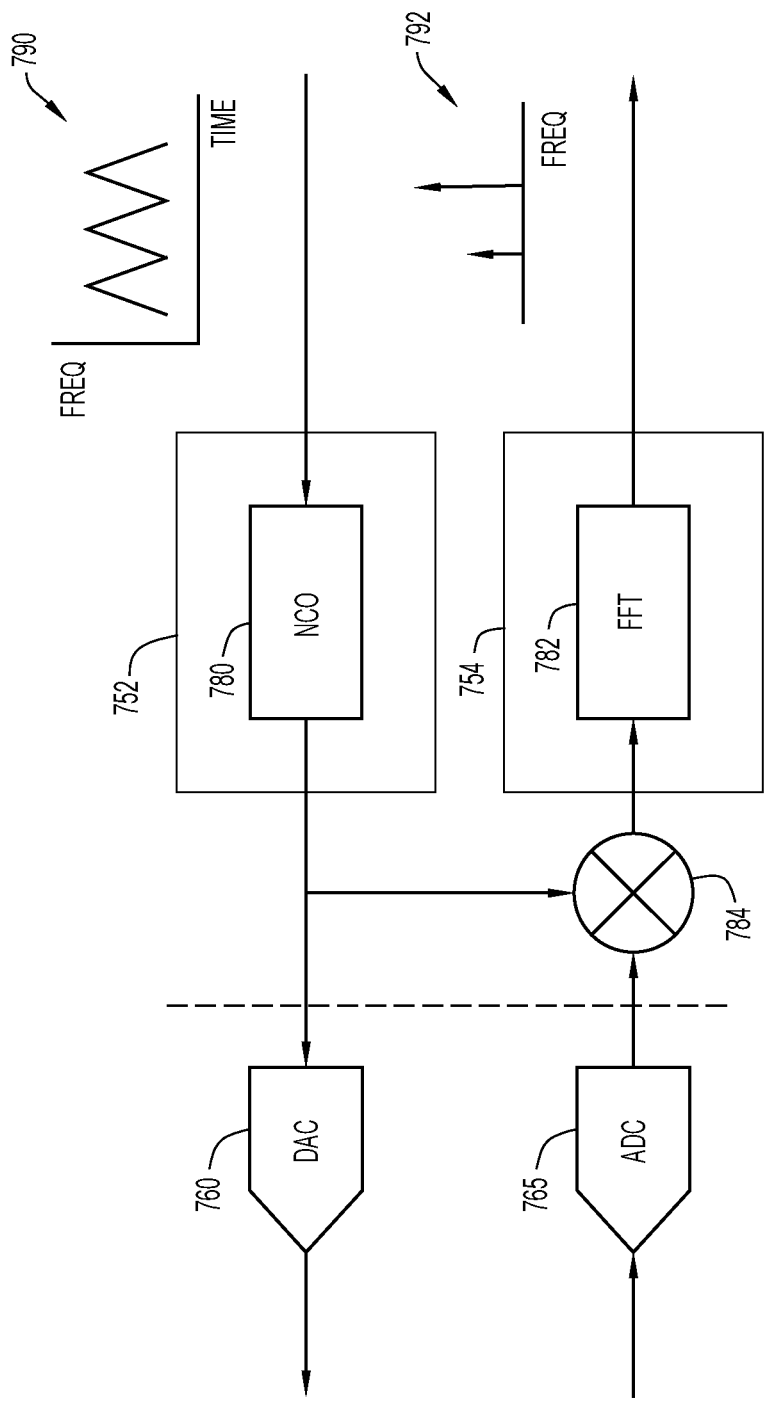
FIG. 13 is a more detailed block diagram of a portion of the lidar sensor system depicted in FIG. 12, according to an example embodiment.

Turning now to FIG. 13, a more detailed diagram of a portion of the lidar sensor system 700 is shown for purposes of describing signal processing operations that may be performed to detect range and velocity of a target. The baseband modulation block 752 may include a numerically controlled oscillator (NCO) 780 and the baseband demodulation block 754 may include a Fast Fourier Transform (FFT) block 782. A de-chirp block 784 is provided that receives the output of the NCO 780 and is used de-chirp (perform symbol multiplication) the output of the ADC 765.

The NCO 780 may generate a linear frequency modulation signal, also known as a "chirp" that is supplied to the DAC 760 to drive the PM modulator 720 shown in FIG. 12. An example of a waveform of the linear frequency modulation signal is shown at 790 in FIG. 13. The linear frequency modulation signal is also supplied to the de-chirp block 784. In the receive/return path, the ADC 765 converts return signal to a digital signal and passes the digital signal to the de-chirp block 784. The de-chirp block 784 generates a de-chirp signal that is supplied to the FFT block 782. The FFT block 782 obtains the frequency components of the de-chirp signal. An example of the frequency components generated by the FFT block 782 is shown at 792. Using well known principles of FMCW techniques, the frequency components generated by the FFT block 782 may be analyzed, such as by the detection processor 756 shown in FIG. 12, to obtain the range and velocity of one or more targets in the field of view of the lidar sensor.

Figure 14:
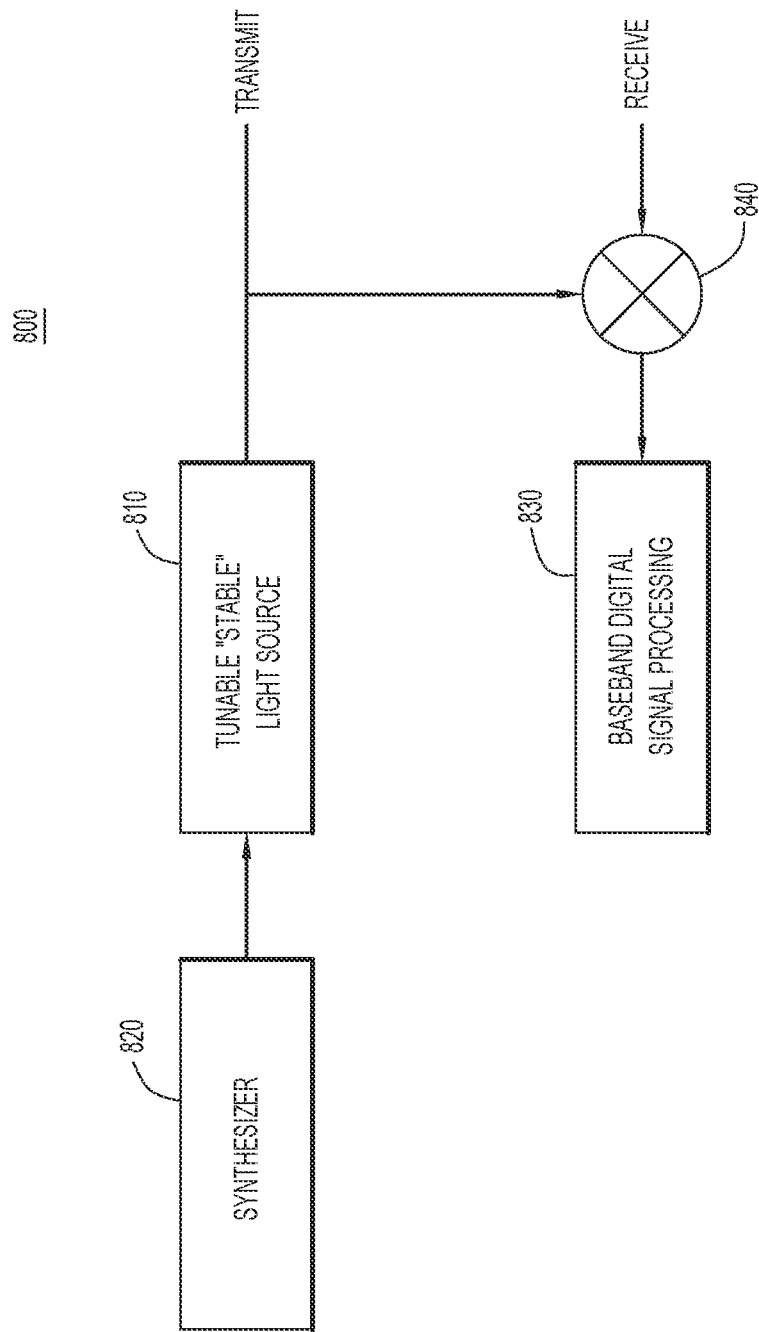
FIG. 14 is a block diagram representation of a lidar system that uses a tunable light source, in accordance with an embodiment.

FIG. 14 is a block diagram representation of another example of a coherent lidar sensor system 800 in accordance with an embodiment. The system 800 includes a tunable stable light source 810 that cooperates with a synthesizer 820 to generate a light beam. The light beam, once transmitted, may be received and processed using baseband digital signal processing block 830 after the received/returned light is mixed by a mixer 840 with the output of the tunable stable light source 810.

In one embodiment, to a first order, the sensitivity or signal-to-noise ratio may be approximately the same when comparing a narrow beam scanned N times in elevation to a single divergent beam integrated N times, using coherent integration, over the same field of view. In such an embodiment, to a second order, a higher sensitivity may be achieved by a single divergent beam than by a narrow beam, as there may effectively be no down time between scans when a single divergent beam is used. As such, objects may be illuminated for a longer amount of time. Further, because a coherent processing time is generally longer for a single divergent beam than for a narrow beam, velocity resolution may be better when using the single divergent beam.

Although only a few embodiments have been described in this disclosure, it should be understood that the disclosure may be embodied in many other specific forms without departing from the spirit or the scope of the present disclosure. By way of example, although a single divergent, fan-shaped beam has been described as suitable for being scanned substantially only in azimuth, a narrow beam may instead be scanned substantially only in azimuth. For an embodiment in which a narrow beam is used, a coherent processing time may be reduced.

Coherent detection has been described as including the use of FMCW or phase coded modulation on a beam. Coherent detection is not limited to the use of FMCW or phase coded modulation on a beam. In general, coherent detection improves the sensitivity associated with a lidar device, and provides a desirable range with respect to a divergent beam.

While a light source has been described as being substantially stationary with respect to an autonomous vehicle, e.g., not rotating, it should be appreciated that in some embodiments, a light source may rotate to scan a beam in azimuth. In other words, any suitable method may be used to provide a beam and to cause the beam to be scanned substantially only in azimuth.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the test module, the network device, the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, a method is provided for performing lidar sensing. The method includes: generating a single divergent light beam; scanning the single divergent light beam in an azimuth direction into a target area; and applying coherent detection based on returned light from the target area to detect one or more objects in the target area. The single divergent light beam may have an elevational component. The single divergent light beam may be a fan-shaped light beam. The operation of generating the single divergent light beam may include generating the single divergent light beam from a stable light source. The operation of scanning may include scanning the single divergent beam approximately 360 degrees around a vehicle to detect the one or more objects in the target area with respect to the vehicle. Moreover, the scanning of the single divergent beam may be achieved by rotating a mirror in the azimuth direction into the target area.

The method may further include, based on the coherent detection, deriving a velocity of the one or more objects in the target area. Further still, the method may include applying baseband modulation to the single divergent light beam, and wherein applying coherent detection includes recovering a modulation of the returned light and analyzing frequency components of the returned light in order to detect the one or more objects in the target area and a velocity of the one or more objects.

In another form, a lidar sensor apparatus is provided that comprises: a light emitter configured to generate a single divergent light beam that has an elevational component; a beam steering mechanism configured to scan the single divergent light beam in an azimuth direction into a target area; and a detector configured to apply coherent detection based on returned light from the target area to detect one or more objects in the target area.

The light emitter, in one form, may include: a stable light source configured to output a light beam; and a divergent beam generator configured to receive the light beam from the stable light source and to generate the single divergent light beam. The beam steering mechanism may include: a mirror that is mounted to a rotating assembly and configured to rotate in order to scan the single divergent light beam in the azimuth direction. In one form, the mirror is a substantially flat mirror.

The divergent beam generator may include, in one form, an optical element configured to generate the single divergent light beam from the light beam output by the stable light source, wherein the optical element is one of: a divergence lens, a diffraction grating and a prism. The optical element may be mounted to the rotating assembly so as to rotate with the mirror. In another form, the divergent the divergent beam generator includes a curved mirror configured to receive the light beam output by the stable light source and to reflect the single divergent light beam into the target area. The beam steering mechanism may include a rotating assembly to which the mirror is attached, the rotating assembly configured to rotate in order to scan the single divergent light beam in the azimuth direction. The beam steering mechanism may be configured to scan the single divergent beam approximately 360 degrees around a vehicle to detect the one or more objects in the target area with respect to the vehicle.

The lidar sensor apparatus may further include a baseband modulator configured to apply baseband modulation to the single divergent light beam, and the detector may include a baseband demodulator configured recover a modulation of the returned light and a detection processor configured to analyze frequency components of the returned light in order to detect the one or more objects in the target area and a velocity of the one or more objects.

In still another form, a lidar sensor system is provided comprising: a stable light source configured to produce a light beam that is substantially continuous; a baseband modulator configured to generate a baseband modulation; an optical transmitter coupled to the baseband modulator and configured to apply the baseband modulation to the light beam and to produce a modulated light beam for transmission into a target area; an optical receiver coupled to the stable light source and configured to receive returned light from the target area; and a baseband demodulator coupled to the optical receiver and configured demodulate the returned light to detect one or more objects in the target area. The baseband modulation may be one of: frequency continuous wave modulation or phase coded modulation.

The lidar sensor system may further include: a divergent beam generator configured to receive the light beam from the stable light source and to generate a single divergent light beam to which the baseband modulator applies the baseband modulation to produce the modulated light beam for transmission into the target area; and a beam steering mechanism configured to scan the single divergent light beam in an azimuth direction into the target area.

The lidar sensor system may further include a detection processor coupled to the baseband demodulator and configured to analyze frequency components of the returned light to determine a velocity of the one or more objects detected in the target area.

In one form, the optical transmitter includes a mixer coupled to an output of the baseband modulator and to the stable light source, the mixer configured to apply the baseband modulation to the light beam, and wherein the optical receiver includes a mixer coupled to the stable light source and configured to mix the returned light with the light beam output by the stable light source.

In another form, the optical transmitter may include: a phase shifter coupled to receive the light beam from the stable light source and configured to phase shift the light beam by approximately 90 degrees to produce a phase shifted light beam; a first mixer coupled to the stable light source and to an output of the baseband modulator, the first mixer configured to apply the baseband modulation to the light beam from the stable light source to produce a first modulated light beam; a second mixer coupled to an output of the baseband modulator and to an output of the phase shifter, the second mixer configured to apply the baseband modulation to the phase shifted light beam to produce a second modulated light beam; and an optical combiner configured to combine the first modulated light beam and the second modulated light beam to produce a modulated transmit light beam for transmission into the target area.

In one form, the optical receiver includes: a phase shifter coupled to receive the light beam from the stable light source and configured to phase shift the light beam by approximately 90 degrees to produce a phase shifted light beam; a first mixer coupled to receive the light beam from the stable light source and the returned light, the first mixer configured to mix the returned light with the light beam to produce a first returned light beam; and a second mixer coupled to receive the phase shifted light beam and the returned light, the second mixer configured to mix the returned light with the phase shifted light beam to produce a second returned light beam; wherein the baseband demodulator is configured to receive as input the first returned light beam and the second returned light beam.

In one form, the lidar sensor system further includes: a digital-to-analog converter coupled to receive an output of the baseband modulator to convert the baseband modulation to an analog modulation signal; and an analog-to-digital converter coupled to convert an analog receive signal derived from the returned light to a digital receive signal to be supplied to the baseband demodulator; wherein the optical transmitter includes an optical phase modulator and an optical amplifier, the optical phase modulator is coupled to receive as input the light beam output by the stable light source and the analog modulation signal, wherein the optical phase modulator is configured to apply the baseband modulation to the light beam to produce the modulated light beam, the optical amplifier configured to amplify the modulated light beam to produce an amplified modulated light beam for transmission into the target area; wherein the optical receiver includes an optical combiner, and a photodetector, the optical combiner configured to receive the returned light and the light beam from the stable light source, wherein the optical combiner is configured to output a combined light beam to the photodetector, wherein the photodetector is configured to convert the combined light beam to the analog receive signal that is coupled to the analog-to-digital converter.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing lidar sensing, comprising:
generating a single divergent light beam from a stable light source to which baseband modulation is applied to produce a modulated light beam;
scanning the modulated light beam in an azimuth direction into a target area;
receiving returned light from the target area with an optical receiver coupled to the stable light source; and
demodulating the returned light with a baseband demodulator and applying coherent detection based on returned light from the target area to detect one or more objects in the target area.

2. The method of claim 1, wherein generating the single divergent light beam has an elevational component.

3. The method of claim 1, further comprising:
based on the coherent detection, deriving a velocity of the one or more objects in the target area.

4. The method of claim 1, wherein the single divergent light beam is a fan-shaped light beam.

5. The method of claim 1, wherein demodulating the returned light with the baseband demodulator and applying coherent detection includes recovering a modulation of the returned light and analyzing frequency components of the returned light in order to detect the one or more objects in the target area and a velocity of the one or more objects.

6. The method of claim 1, wherein scanning includes scanning the single divergent light beam approximately 360 degrees around a vehicle to detect the one or more objects in the target area with respect to the vehicle.

7. The method of claim 1, wherein scanning includes rotating a mirror in the azimuth direction into the target area.

8. The method of claim 1, wherein receiving returned light from the target area further includes mixing, with a mixer of the optical receiver, the returned light with a light beam output by the stable light source.

9. The method of claim 1, wherein generating includes applying, with a mixer, the baseband modulation to a light beam obtained from the stable light source to produce the modulated light beam.

10. A lidar sensor system comprising:
a stable light source configured to produce a light beam that is substantially continuous;
a baseband modulator configured to generate a baseband modulation;
an optical transmitter coupled to the baseband modulator and comprising a mixer coupled to an output of the baseband modulator and to the stable light source, the mixer configured to apply the baseband modulation to the light beam and to produce a modulated light beam for transmission into a target area;
an optical receiver coupled to the stable light source and configured to receive returned light from the target area, wherein the optical receiver includes a mixer coupled to the stable light source configured to mix the returned light with the light beam output by the stable light source; and
a baseband demodulator coupled to the optical receiver and configured to demodulate the returned light to detect one or more objects in the target area.

11. The lidar sensor system of claim 10, further comprising a detection processor coupled to the baseband demodulator and configured to analyze frequency components of the returned light to determine a velocity of the one or more objects detected in the target area.

12. The lidar sensor system of claim 10, wherein the optical transmitter includes:
a phase shifter coupled to receive the light beam from the stable light source and configured to phase shift the light beam by approximately 90 degrees to produce a phase shifted light beam;
a first mixer coupled to the stable light source and to an output of the baseband modulator, the first mixer configured to apply the baseband modulation to the light beam from the stable light source to produce a first modulated light beam;
a second mixer coupled to an output of the baseband modulator and to an output of the phase shifter, the second mixer configured to apply the baseband modulation to the phase shifted light beam to produce a second modulated light beam; and
an optical combiner configured to combine the first modulated light beam and the second modulated light beam to produce a modulated transmit light beam for transmission into the target area.

13. The lidar sensor system of claim 10, wherein the optical receiver includes:
   a phase shifter coupled to receive the light beam from the stable light source and configured to phase shift the light beam by approximately 90 degrees to produce a phase shifted light beam;
   a first mixer coupled to receive the light beam from the stable light source and the returned light, the first mixer configured to mix the returned light with the light beam to produce a first returned light beam; and
   a second mixer coupled to receive the phase shifted light beam and the returned light, the second mixer configured to mix the returned light with the phase shifted light beam to produce a second returned light beam;
   wherein the baseband demodulator is configured to receive as input the first returned light beam and the second returned light beam.

14. The lidar sensor system of claim 10, wherein the baseband modulation is frequency continuous wave modulation or phase coded modulation.

15. The lidar sensor system of claim 10, further comprising:
   a divergent beam generator configured to receive the light beam from the stable light source and to generate a single divergent light beam to which the baseband modulation is applied by the mixer to produce the modulated light beam for transmission into the target area; and
   a beam steering mechanism configured to scan the modulated light beam in an azimuth direction into the target area.

16. A lidar sensor system comprising:
   a stable light source configured to produce a light beam that is substantially continuous;
   a baseband modulator configured to generate a baseband modulation;
   an optical transmitter coupled to the baseband modulator and configured to apply the baseband modulation to the light beam from the stable light source to produce a modulated light beam, wherein the optical transmitter includes a divergent beam generator configured to receive the modulated light beam to generate a single divergent light beam, wherein the optical transmitter includes a first mixer coupled to an output of the baseband modulator and to the stable light source, the first mixer configured to apply the baseband modulation to the light beam;
   a beam steering mechanism configured to scan the single divergent light beam in an azimuth direction into a target area;
   an optical receiver coupled to the stable light source and configured to receive returned light from the target area, wherein the optical receiver includes a first mixer coupled to the stable light source and configured to mix the returned light with the light beam output by the stable light source to produce mixed light output; and
   a baseband demodulator coupled to the optical receiver and configured to demodulate the mixed light output to enable detection of one or more objects in the target area.

17. The lidar sensor system of claim 16, wherein the beam steering mechanism includes:
   a mirror that is mounted to a rotating assembly and configured to rotate in order to scan the single divergent light beam in the azimuth direction.

18. The lidar sensor system of claim 16, wherein the divergent beam generator includes an optical element configured to generate the single divergent light beam from the light beam output by the stable light source, wherein the optical element is one of: a divergence lens, a diffraction grating and a prism.

19. The lidar sensor system of claim 16, further comprising a detection processor coupled to the baseband demodulator and configured to analyze frequency components of the returned light to determine a velocity of the one or more objects detected in the target area.

20. The lidar sensor system of claim 16, wherein the first mixer of the optical transmitter is coupled to the stable light source and to an output of the baseband modulator, the first mixer configured to apply the baseband modulation to the single divergent light beam to produce a first modulated light beam, and wherein the optical transmitter further includes:
   a phase shifter coupled to receive the light beam from the stable light source and configured to phase shift the light beam by approximately 90 degrees to produce a phase shifted light beam;
   a second mixer coupled to an output of the baseband modulator and to an output of the phase shifter, the second mixer configured to apply the baseband modulation to the phase shifted light beam to produce a second modulated light beam; and
   an optical combiner configured to combine the first modulated light beam and the second modulated light beam to produce the modulated light beam.

21. The lidar sensor system of claim 16, wherein the first mixer of the optical receiver is coupled to receive the light beam from the stable light source and the returned light, the first mixer configured to mix the returned light with the light beam to produce a first returned light beam, and wherein the optical receiver further includes:
   a phase shifter coupled to receive the light beam from the stable light source and configured to phase shift the light beam by approximately 90 degrees to produce a phase shifted light beam; and
   a second mixer coupled to receive the phase shifted light beam and the returned light, the second mixer configured to mix the returned light with the phase shifted light beam to produce a second returned light beam;
   wherein the baseband demodulator is configured to receive as input the first returned light beam and the second returned light beam.

22. The lidar sensor system of claim 16, wherein the baseband modulation is frequency continuous wave modulation or phase coded modulation.

23. A lidar sensor system comprising:
   a stable light source configured to produce a light beam that is substantially continuous;
   a baseband modulator configured to generate a baseband modulation;
   an optical transmitter coupled to the baseband modulator and configured to apply the baseband modulation to the light beam, wherein the optical transmitter includes:
     a phase shifter coupled to receive the light beam from the stable light source and configured to phase shift the light beam by approximately 90 degrees to produce a phase shifted light beam;
     a first mixer coupled to the stable light source and to an output of the baseband modulator, the first mixer configured to apply the baseband modulation to the light beam from the stable light source to produce a first modulated light beam;
     a second mixer coupled to an output of the baseband modulator and to an output of the phase shifter, the second mixer configured to apply the baseband modulation to the phase shifted light beam to produce a second modulated light beam; and an optical combiner configured to combine the first modulated light beam and the second modulated light beam to produce a modulated transmit light beam for transmission into a target area;

an optical receiver coupled to the stable light source and configured to receive returned light from the target area; and a baseband demodulator coupled to the optical receiver and configured to demodulate the returned light to detect one or more objects in the target area.

24. A lidar sensor system comprising:

a stable light source configured to produce a light beam that is substantially continuous;

a baseband modulator configured to generate a baseband modulation;

an optical transmitter coupled to the baseband modulator and configured to apply the baseband modulation to the light beam and to produce a modulated light beam for transmission into a target area;

an optical receiver coupled to the stable light source and configured to receive returned light from the target area; and a baseband demodulator coupled to the optical receiver and configured to demodulate the returned light to detect one or more objects in the target area;

wherein the optical receiver includes:

a phase shifter coupled to receive the light beam from the stable light source and configured to phase shift the light beam by approximately 90 degrees to produce a phase shifted light beam;

a first mixer coupled to receive the light beam from the stable light source and the returned light, the first mixer configured to mix the returned light with the light beam to produce a first returned light beam; and a second mixer coupled to receive the phase shifted light beam and the returned light, the second mixer configured to mix the returned light with the phase shifted light beam to produce a second returned light beam;

wherein the baseband demodulator is configured to receive as input the first returned light beam and the second returned light beam.

* * * * *